(12) United States Patent
Masterson et al.

(10) Patent No.: US 8,526,465 B1
(45) Date of Patent: *Sep. 3, 2013

(54) MEDIA TRANSMISSION USING AGGREGATED BANDWIDTH OF DISPARATE COMMUNICATION CHANNELS

(75) Inventors: Anthony D. Masterson, Saratoga, CA (US); Amir M. Mobini, San Francisco, CA (US)

(73) Assignee: Zenverge, Inc., Santa Clara, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 13/227,340

(22) Filed: Sep. 7, 2011

Related U.S. Application Data (63) Continuation of application No. 12/362,389, filed on Jan. 29, 2009, now Pat. No. 8,050,289.

(60) Provisional application No. 61/025,609, filed on Feb. 1, 2008.

(51) Int. Cl.
*H04J 3/16* (2006.01)
(52) U.S. Cl.
USPC .......................................................... 370/465
(58) Field of Classification Search
USPC ................. 370/229–240, 310–337, 338–394, 370/395.3–457
See application file for complete search history.

(56) References Cited

U.S. PATENT DOCUMENTS

| | | | | |
|---|---|---|---|---|
| 4,727,536 A * | 2/1988 | Reeves et al. | ................. | 370/468 |
| 5,815,492 A * | 9/1998 | Berthaud et al. | ............. | 370/234 |
| 5,907,556 A * | 5/1999 | Hisanaga et al. | ............ | 370/468 |
| 5,923,667 A * | 7/1999 | Poiraud et al. | ................ | 370/515 |
| 5,940,372 A * | 8/1999 | Bertin et al. | .................. | 370/238 |
| 6,477,167 B1 * | 11/2002 | Wu | .......................... | 370/395.21 |
| 6,628,670 B1 * | 9/2003 | Galand et al. | ................. | 370/468 |
| 6,687,758 B2 * | 2/2004 | Craft et al. | .................... | 709/250 |
| 6,731,696 B1 * | 5/2004 | Gelblum et al. | ............. | 375/322 |
| 6,973,504 B2 * | 12/2005 | Nomura | ........................ | 709/235 |
| 7,023,800 B1 * | 4/2006 | McAuley et al. | ............. | 370/235 |
| 7,047,309 B2 * | 5/2006 | Baumann et al. | ............ | 709/232 |
| 7,190,696 B1 * | 3/2007 | Manur et al. | ................... | 370/392 |
| 7,203,206 B2 * | 4/2007 | Amidan et al. | .............. | 370/474 |
| 7,321,960 B2 * | 1/2008 | Boyd et al. | .................... | 711/162 |
| 7,453,804 B1 * | 11/2008 | Feroz et al. | ................... | 370/230 |
| 7,492,789 B2 * | 2/2009 | Shvodian | ...................... | 370/469 |
| 7,640,364 B2 * | 12/2009 | Craft et al. | .................... | 709/250 |
| 7,672,234 B2 * | 3/2010 | McAuley et al. | ............. | 370/230 |
| 7,693,226 B1 * | 4/2010 | Lo | ................................... | 375/260 |
| 7,697,431 B1 * | 4/2010 | Bangolae et al. | ............ | 370/235 |
| 7,805,156 B1 * | 9/2010 | Allen et al. | ................. | 455/550.1 |
| 2002/0103924 A1 * | 8/2002 | Nomura | ........................ | 709/235 |
| 2004/0081165 A1 * | 4/2004 | Carr et al. | ................. | 370/395.21 |
| 2004/0213197 A1 * | 10/2004 | Zimmerman et al. | ........ | 370/346 |
| 2005/0050287 A1 * | 3/2005 | Boyd et al. | .................... | 711/162 |
| 2007/0006024 A1 * | 1/2007 | Boyd et al. | ...................... | 714/10 |
| 2007/0121678 A1 * | 5/2007 | Brooks et al. | ................. | 370/505 |

(Continued)

*Primary Examiner* — Jung-Jen Liu
(74) *Attorney, Agent, or Firm* — Fenwick & West LLP (57) ABSTRACT

A method and/or system of transmitting media items using aggregating bandwidths of disparate communication channels between a media source and a media player. By using the combined bandwidth of more than one communication channel, a media item that requires a bandwidth larger than a single communication channel can be transmitted. The media source also converts the media item depending on the available bandwidth of the communication channels. By dynamically changing the formats of the media item, more robust and reliable communication between the media source and the media player can be achieved.

17 Claims, 8 Drawing Sheets

(56) References Cited

U.S. PATENT DOCUMENTS

| | | | |
|---|---|---|---|
| 2008/0152003 A1* | 6/2008 | Oguz | 375/240.12 |
| 2008/0220787 A1* | 9/2008 | Stanwood et al. | 455/450 |
| 2008/0220788 A1* | 9/2008 | Stanwood et al. | 455/450 |
| 2008/0291927 A1* | 11/2008 | Yong et al. | 370/400 |
| 2009/0028182 A1* | 1/2009 | Brooks et al. | 370/466 |
| 2009/0031384 A1* | 1/2009 | Brooks et al. | 725/127 |
| 2009/0077577 A1* | 3/2009 | Allegrezza et al. | 725/14 |
| 2009/0102969 A1* | 4/2009 | Knutson et al. | 348/471 |
| 2009/0110033 A1* | 4/2009 | Shattil | 375/141 |
| 2010/0011012 A1* | 1/2010 | Rawson | 707/101 |
| 2010/0094955 A1* | 4/2010 | Zuckerman et al. | 709/219 |
| 2010/0094956 A1* | 4/2010 | Zuckerman et al. | 709/219 |
| 2010/0202310 A1* | 8/2010 | Lee et al. | 370/252 |
| 2010/0208588 A1* | 8/2010 | Vinokour et al. | 370/230.1 |

\* cited by examiner

MEDIA TRANSMISSION USING AGGREGATED BANDWIDTH OF DISPARATE COMMUNICATION CHANNELS

CROSS-REFERENCE TO RELATED APPLICATION

This application is a continuation of U.S. patent application Ser. No. 12/362,389, filed on Jan. 29, 2009, entitled "Media Transmission Using Aggregated Bandwidth of Disparate Communication Channels," which claims priority under 35 U.S.C. §119(e) to U.S. Provisional Patent Application No. 61/025,609 entitled "Media Transmission Using Aggregated Bandwidth of Disparate Communication Channels," filed on Feb. 1, 2008, which are incorporated by reference herein in their entirety.

BACKGROUND

1. Field of Art

The disclosure relates generally to a method and/or system of transmitting media items from a media source to a media player, and more specifically, to transmitting the media items which provides a continuous media experience even when a communication channel is disrupted or does not have sufficient bandwidth to transmit the media item.

2. Description of Related Art

Many households have multiple media sources and media players (hereinafter collectively called "media devices"). Although some media sources can allow a user to experience media items without separate media players, many media sources must be hooked up to the media players for the user to experience the media items. Commonly used media sources include set-top boxes (STB), videocassette recorders (VCR), personal computers, and digital video recorders (DVR). Some media sources (e.g., a set-top box) receive streaming data from external sources whereas other media sources (e.g., a DVD player) read data stored on storage devices (e.g., a DVD disk). The media players coupled to the media sources include personal computers, televisions, and audio systems.

Conventionally, the media devices were connected by one or more dedicated lines. For example, RCA type connectors or S-Video connectors were often used to transmit video signals between the media devices. These dedicated lines are often shielded from interferences and has sufficient bandwidth to transmit necessary signals between the media sources and the media players. Such connectors, however, are compatible with a limited number of compatible devices. Moreover, such connectors can provide communication only if the media devices are in close proximity, typically within 10 yards.

Accordingly, the media devices in close proximity form an island separated from other islands consisting of other sets of media devices. For example, one island may consist of an audio system, and a large screen TV in a living room. Another island may consist of a personal computer and a LCD monitor in a bedroom. Generally, the devices of the two islands remain isolated from each other and do not communicate.

Various attempts have been made to provide interoperability between the islands of the media devices. For example, Digital Living Network Alliance (DLNA) published a set of industry design guidelines to allow the interoperability between the various media devices. The DLNA attempts to remove the island effect by allowing media devices to communicate through common communication channels. The DLNA uses various wired or wireless communication channels along with IPv4 protocol suites to provide connection between the various media devices.

The available bandwidth of the common communication channels, however, can fluctuate as a result of external interferences. A wireless communication channel can be interfered by other radio signals or other wireless stations using the same channel. Power line communication (PLC) channels also can be interfered when appliances requiring high electric consumption are turned to an on state. Sometimes the whole communication channel may become unavailable due to overloaded traffic or extreme interferences.

Sometimes a broadband communication channel is required between the media sources and the media players to transmit media items such as high-definition (HD) video files across the media devices. This broadband communication channel may have reduced capacity due to other communication traffic or interferences. In such cases where the broadband communication channel is unavailable or its capacity significantly reduced, the media item played on the media players may be severely distorted or fragmented. Rather than viewing distorted or fragmented media items in a high-quality format, the user may prefer to view the media item in a standard definition (SD) or a lower definition format. In conventional systems and methods, however, the user must manually perform conversion of the file or configure the media source so that the data from the media source may be transmitted over the communication channel with a reduced bandwidth.

Using conventional methods of transmitting media items, the media items cannot be experienced in real time unless the communication channel between the media sources and the media players has a sufficient bandwidth. Even if multiple communications channels are available between the media sources and the media players, conventional methods do not leverage the combined bandwidth of each communication channel.

Therefore, the present art lacks, inter alia, a method and/or system of transmitting media items across media devices that allows the user to experience the media item even when there are disruptions or interferences in a communication channel. Further, it lacks, inter alia, a method and/or system of transmitting media items that allows the user to experience media items requiring a bandwidth larger than the bandwidth of one communication channel provided between the media devices.

SUMMARY

The disclosed embodiments are of a system (and/or method) configured to address shortcomings of the art, including those previously described. In one example embodiment, a media item is transmitted from a media source to a media player using a combined bandwidth of more than one communication channel. The bandwidth of each communication channel is detected. The combined bandwidth of all available communication channels is determined. The media source uses two or more of these available communication channels to transmit the media item to the media player when one communication channel does not have a sufficient bandwidth to transmit the media item.

In another example embodiment, the media item is converted so that it can be transmitted over the combined bandwidth of all available communication channels. If the combined bandwidth of the available communication channels is sufficiently large, the media source transmits the media item in a format that allows the media player to play the media item in a high quality (e.g., high definition or high fidelity). If the combined bandwidth of the available communication channel is not sufficiently large to carry the media item in a high quality format, the media source converts the media item into a format that can be transmitted over a smaller bandwidth. The bandwidths of the communication channels are monitored and the transitions between the formats of the media items are performed automatically by the media source.

In an example embodiment, the media item is packetized into packets for transmission over the communication channels. Various schemes may be used to determine which communication channel the packets should travel before reaching the media source. In one example embodiment, the packets including critical data (e.g., header information of compressed video data) may be transmitted from the media source to the media player over the most reliable communication channels. In another example embodiment, the packets for certain data are sent over the communication channels that are shared by the most number of media sources or media players.

In one example embodiment, the available communication channels are initially determined by sending of a test signal (e.g., test packets) by the media source to the media player. The media player responds to the media source by sending a reply signal to the media source. After the initial determination, the media source may periodically send test signals to the media player to determine whether any other communication channels have become available for transmitting the media item.

In one example embodiment, the media source detects whether another media source is communicating over a communication channel. When the communication channel is being used by the other media source, the media sources resolve conflicts over the use of the communication channels using predetermined media access control schemes.

In one example embodiment, the media source receives information on the capability of the media player over the communication channels. Based on the information, the media source transmits the media item in a format that is compatible with the media player. When multiple media players are requesting the same media item, a format that is compatible with all of the requesting media players may be selected for transmission.

In one example embodiment, the media player generates information representing a quality of service (QoS) of each available communication channels. The information is then transmitted to the media source. The media source can dynamically adjust the packets to be sent over each communication channels based on the QoS information.

In one example embodiment, the media player searches for the available communication channels and the media sources accessible through the communication channels. The media player may periodically search for other available communication channels and the media sources.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

The embodiments described herein will be with reference to the accompanying drawings where feasible, like reference numerals are used for like elements in the accompanying drawings.

Overview of the Architecture

In embodiments described herein, media sources transmit media items to media players using two or more communication channels. The media sources packetize the media item into packets. The media source determines the types and the number of packets to be sent over available communication channels. If the combined bandwidth of the available communication channels is not sufficient to send the media item, the media item is converted into a format that requires a smaller bandwidth. The media player receives the packets, reconstructs the media item from the packets, and plays the media item. By combining the bandwidth of the communication channels, the media item that previously could not be transmitted over a single communication channel can now be transmitted. Also, the communication between the media source and the media player is more reliable and robust because other communication channels can be used if some communication channels become disrupted or interfered.

The media source includes any device that can transmit the media item to another device (e.g., media player). The media sources includes, among other devices, cable, satellite, IPTV set-top boxes (STB), videocassette recorders (VCR), a radio tuner, personal computers, game consoles, camcorders, TV sets with analog and/or digital tuners, cell phones that contain an image sensor and are capable of recording or sending video, and digital video recorders (DVR). Some media sources (e.g., set-top boxes) receive streaming data from external sources whereas other media sources (e.g., DVD players) read data stored on storage devices. Also, some media sources (e.g., personal computers) can play the media item without the support of other media players. In contrast, other media sources (set-top boxes) require supporting media players to play the media item. The media sources may be implemented as a dedicated device for storing and transmitting the media items or be a general purpose machine that includes media source functionality.

The media player includes any device that can play at least one type of media item. The media players include, among other devices, cable, satellite, IPTV set-top boxes (STB), videocassette recorders (VCR), a radio tuner, personal computers, game consoles, camcorders, cell phone, PDA, digital video recorders (DVR), televisions, video monitors, MP3 players, audio systems, and haptic manipulators Note that the media player and the media source are not mutually exclusive. Some media devices (e.g., personal computer) may function as both the media player and the media source. Also, the media players may be implemented as a dedicated device for playing the media items or be a general purpose machine that can also function as a media player.

The media item includes any data convertible to physical properties that can be listened to, be watched or be felt by the user using the media player. The media items include, among other data, video data, audio data, still images, texts, and haptic information. Some types of the media items may be played only on certain types of media players. The media items can often be converted from one format to another, each format often requiring a different bandwidth to transmit in real time. For example, the video data can be in various resolution formats, including a low-definition (LD) format, a standard-definition (SD) format, an enhanced-definition (ED) format, and a high-definition (HD) format. The HD format video data have, for example, 720 or 1080 horizontal lines per frame and requires the largest bandwidth. The LD format video data, on the other hand, have, for example, 240 or 288 horizontal lines per frame and requires the least bandwidth among the above-mentioned formats.

The conversion of format herein described refers to any processes to the media item, carried out either in the compressed or decompressed domain of the media item. The conversion that can be performed may differ depending on the types of the media items. For example, the conversion to compressed video data includes, among other processes, transcoding, transrating, transcaling, and transcrypting. For non-compressed video data, the conversion includes lossless or lossy compression. The conversion also includes various types of signal processing or media item enhancements such as noise reductions.

Figure 1:
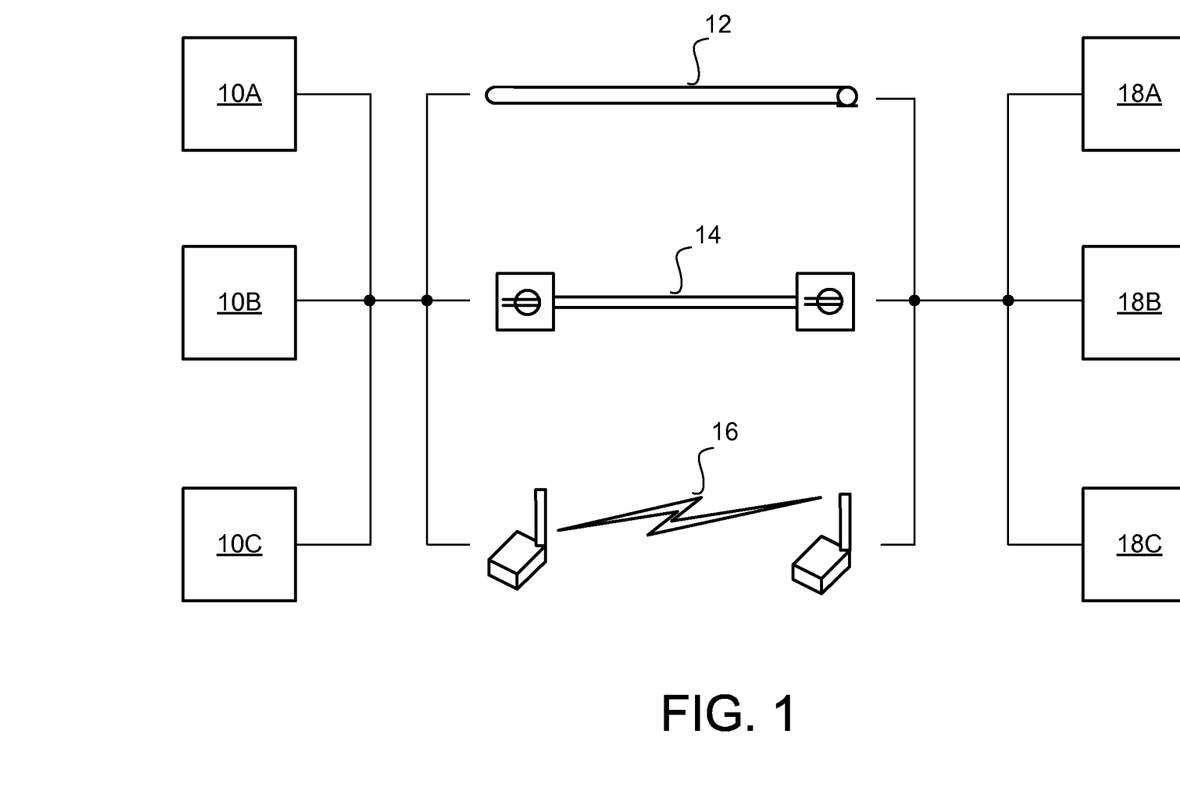
FIG. 1 is a schematic diagram illustrating one embodiment of media sources communicating with media players through multiple communication channels.

FIG. 1 is a schematic diagram illustrating the media sources 10A through 10C communicating with the media players 18A through 18C via multiple communication channels 12, 14, 16. Each of the media sources 10A through 10C is generally referred to as media source 10. Each of the media players 18A through 18C is generally referred to as media player 18. The media sources 10 and the media player 18 communicate through one or more communication channels 12, 14, 16 that use different physical media. In the example of FIG. 1, the communication channels include, a coaxial cable 12, a power line communication (PLC) line 14, and a wireless communication channel 16.

In this example, the fluctuation in the available bandwidth of each communication channel 12, 14, 16 can be caused by various reasons including use of the channel by other communication devices. For example, the communication channel 12, 14, 16 may be used by other communication devices such as home networking devices. When the communication channel is shared with other devices, the available bandwidth for the media sources 10 and the media players 18 may be reduced. As explained below, the media sources 10, the media players 18, and other home network devices may coordinate their access to the same communication channels through respective Media Access Control (MAC) layers.

Another reason that the bandwidth of the communication channel can be reduced is interference. For example, the PLC line 14 may experience interference from electric appliances that are coupled to the same power line 14.

In one embodiment, the media sources 10 and the media players 18 operate in only in a unicast mode. In the unicast mode, one media source 10 (e.g., the media source 10A) sends the media item only to one targeted media player 18 (e.g., the media player 18A). No other media player 18 can play the same content from the media source 10 in the unicast mode. Encryption of the media item may be used to implement the unicast mode. In embodiments using the encryption, only the media players 18 with proper encryption keys may decrypt and play the media item.

In another embodiment, the media sources 10 and the media players 18 can operate in a multicast or a broadcast mode. In the multicast mode, the media item from one media source 10 (e.g., the media source 10A) can be targeted to more than one media player 18 (e.g., the media players 18A, 18B). Finally, in the broadcast mode, the media item from one media source 10 (e.g., the media source 10A) can be shared by all of the media players 18 (e.g., the media players 18A through 18C) connected to the communication channels 12, 14, 16 between the media source 10 and the media players 18.

Architecture of the Media Source

Figure 2:
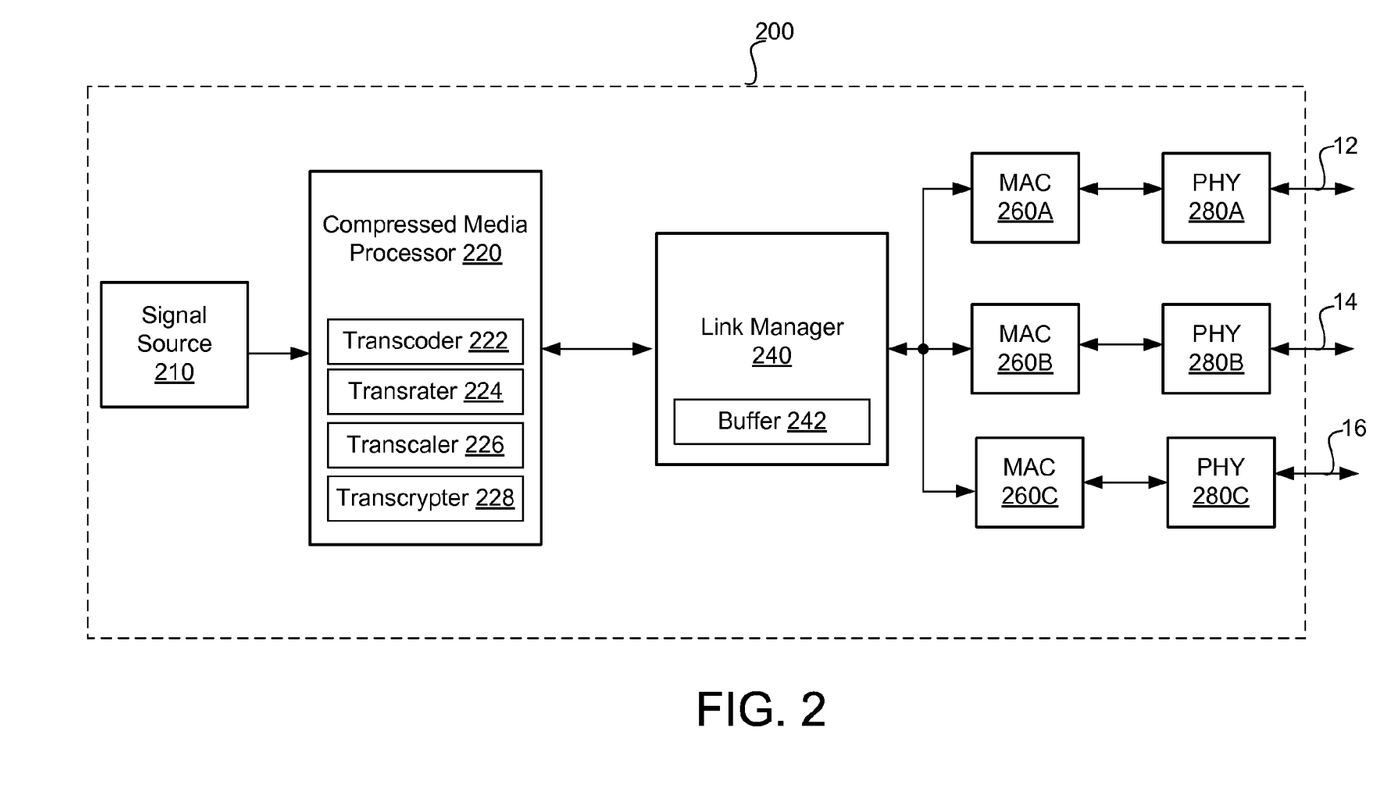
FIG. 2 is a block diagram illustrating an embodiment of a media source.

FIG. 2 is a block diagram illustrating an embodiment of a media source 200. The media source 200 includes, among other components, a signal source 210, a compressed media processor 220, a link manager 240, Media Access Control (MAC) layers 260A through 260C, and Physical (PHY) layers 280A through 280C. The signal source 210 retrieves data from storage devices (e.g., DVD disks) or receives data from external devices (e.g., a satellite dish), and provides the data to the compressed media processor 220. The signal source 210 can be any device that is capable of receiving or retrieving the data including, among other devices, a tuner, a laser pickup assembly, a hard disk drive, a video tape head assembly, and a magnetic medium reader. When a tuner is used as the signal source 210, the tuner can be coupled to external communication channels such as an Ethernet cable, a satellite-dish, a coaxial cable, a telephone line, or a VHF or UHF antenna.

The data sent from the source 210 to the compressed media processor 220 can be compressed or decompressed data. In one embodiment, the compressed media processor 220 converts the media item from one format to another or bypasses the media item unconverted based on the instructions from the link manager 240. In order to convert the media item, the compressed media processor 220 includes, among other modules, a transcoder 222, a transrater 224, a transcaler 226, and a transcrypter 228. The transcoder 222 converts the media item from one format to another. For example, the trancoder 222 can convert a media item in a MPEG-2 format into a media item in a H.264 format. The transrater 224 controls and can vary the bit rate of a media item. The transcaler converts the resolution of the media item (e.g., a high-definition video data to a standard-definition video data). The transcrypter 228 changes the digital rights management (DRM) from one type to another (e.g. from 3DES to AES). Note that the compressed media processor 220 may include all or some of these modules.

The link manager 240 determines the available communication channels to the media players 18 and their bandwidths. To determine available communication channels 12, 14, 16 to the media players, the link manager 240 starts a testing process by sending test packets to the media players 18 using all of the communication channels 12, 14, 16 that can be accessed by the media source 200. In response, the media players 18 send replies to the media source 200 through all of the communication channels 12, 14, 16. The media source 200 determines the available bandwidth of each communication channel 12, 14, 16 from the replies sent from the media sources. The testing process may be repeated periodically to detect new communication channels 12, 14, 16 or new media players 18. In one embodiment, a Universal Plug and Play (UPnP) architecture is used to detect the media players 18.

In one embodiment, the media source 200 determines only an approximate bandwidth of the available communication channels during the process of sending the test packets and receiving the replies from the media players 18. A more accurate bandwidth may be determined later by the media source 200 after starting a session with a media player 18. Once the session starts, the media source 200 determines the available bandwidth of the communication channels 12, 14, 16 based on the QoS information received from the media players 18 as explained below in detail.

The link manager 240 packetizes the media item received from the compressed media processor 220. The link manager 240 splits the media item into multiple packets and sends the packets to the MAC layers 260A, 260B, 260C. The number and types of the packets to be sent to the MAC layers 260A, 260B, 260C are determined by the link manager 240. Various packetizing schemes including, among other schemes, a variant of IPv4 or IPv6 can be used. In the variant IPv4 or IPv6 packetizing scheme, the header of each packet includes a field indicating the communication channel over which the packets should travel. The link manager 240 monitors and determines the available bandwidth of each communication channels 12, 14, 16. If the available bandwidth of some communication channels decrease, the link manager 240 may increase the number of packets sent over the other communication channels. If the available bandwidth of some communication channels increase, the link manager 240 may accordingly increase the number of packets sent over that communication channels. The method of determining the available bandwidth is explained below in detail.

The link manager 240 may add error resilience to the communication between the media source 10 and the media player 18. In one embodiment, redundant packets including critical data are generated by the link manager 240. In another embodiment, forward error correction (FEC) is implemented for all or selected packets by the link manager 240. The FEC allows the media players 18 to detect and correct errors without the need to ask the media source 200 for additional data.

In one embodiment, the link manager 240 scores and prioritizes the data to be sent over the communication channels 12, 14, 16. The data scored with a high priority are sent over the most reliable communication channels (e.g., Ethernet). Conversely, the data scored as having a lower priority are sent over less reliable communication channels (e.g., a wireless communication channel). The data with the highest priority may include, among other data, header information, data for I-frames of the compressed video data, motion vectors, macroblock type, and data for decryption of the media items. The data with a lower priority may include, among other data, redundant packets, and residual data for P or B frames of the compressed video data. The reliability of the communication channels can be predetermined by the user or it can be adjusted based on the history of communication between the media source 200 and the media players 18.

During a session with the media player 18, the link manager 240 constantly monitors the available bandwidth of each communication channel 12, 14, 16. The available bandwidth of the communication channels 12, 14, 16 may be determined from information including, among other information, the quality of service (QoS) information received from the media players 18 as explained below in detail. In one embodiment, a dedicated communication channel for receiving the QoS information is provided between the media source 200 and the media players 18.

The link manager 240 dynamically changes the format or resolution or bit rate of the media item or bypasses the media item unconverted based on the combined bandwidth of all of the available communication channels 12, 14, 16. If the combined bandwidth of all of the available communication channels falls below a threshold level, the link manager 240 instructs the compressed media processor 220 to convert the format of the media item to a format or resolution or bit rate that requires less bandwidth to transmit. When the bandwidth of the communication channels 12, 14, 16 is recovered or increased (due to, for example, reduced traffic from other communication devices, reduced interference or the discovery of a new communication channel), the link manager 240 instructs the compressed media processor 220 to bypass the media item unconverted or convert the media item into a format or resolution or bit rate that allows a higher bandwidth. For example, the compressed media processor 220 can maintain the media item in a high-definition format (i.e., not convert) or convert an uncompressed media item into a high-definition format when the available bandwidth is sufficient. But when the available bandwidth is insufficient to transmit in the hi-definition format, the compressed media processor 220 converts the media item into a standard-definition format.

In one embodiment, the link manager 240 includes a buffer 242 for storing the media file or the packets to be sent over to the media players 18 over the communication channels 12, 14, 16.

Each of the MAC layer 260A through 260C is generally referred to as the MAC layer 260. Each of the PHY layer 280A through 280C is generally referred to as the PHY layer 280. The MAC layer 260 and the counterpart PHY layer 280 are coupled to the communication channel 12, 14, 16 to provide communication between the media source 200 and the media players 18. As well know in the art, the MAC layer 260 provides addressing and channel access control mechanisms that make it possible for two or more media sources 200 and the media players 18 to communicate with each other. Various media access control schemes such as Carrier Sense Multiple Access with Collision Detection (CSMA/CD), Carrier Sense Multiple Access with Collision Avoidance (CSMA/CA), Multiple Access with Collision Avoidance for Wireless (MACAW), token passing schemes, and polling schemes may be used. As well know in the art, the PHY layer 280 performs services requested by the MAC layer 260 and provides electrical, mechanical, and procedural interface to the transmission medium.

Each of these functional components in the media source 200 can be implemented separately or can be implemented together. For example, the compressed media processor 220 and the link manager 240 can be implemented as a single module. Moreover, each component, whether alone or in combination with other components, can be implemented for example, in software, hardware, firmware or any other combination thereof.

Architecture of the Media Player

Figure 3:
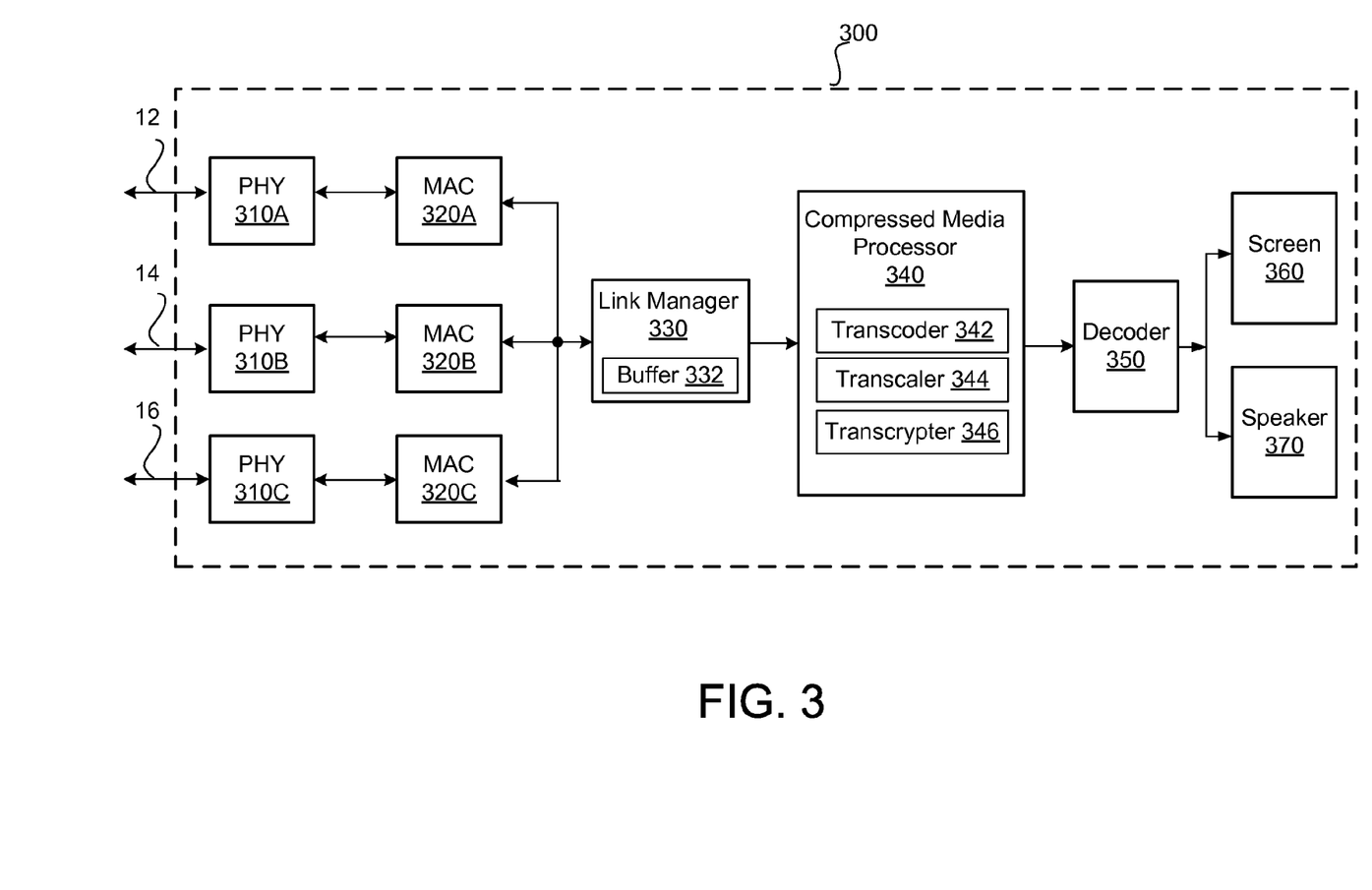
FIG. 3 is a block diagram illustrating an embodiment of a media player.

FIG. 3 is a block diagram illustrating an embodiment of a media player 300. The media player 300 includes, among other components, PHY layers 310A through 310C, MAC layers 320A through 320C, a link manager 330, a compressed media processor 340, a decoder 350, a screen 360, and a speaker 370. Each of the PHY layers 310A through 310A is referred to as the PHY layer 310. Each of the MAC layers 320A through 320A is referred to as the MAC layer 320. The PHY layers 310 and the MAC layers 320 serve the same functions explained above with reference to the media source 200 of FIG. 2.

The link manager 330 of the media player 300 is coupled to the MAC layers 320 to receive the packets sent from the media sources 10. The link manager 330 reconstructs the media item received from the MAC layers 320. The link manager 330 may include a buffer 332 for storing the packets from the MAC layers 320A through 320C.

When the media player 300 is initialized, the link manager 330 discovers all of the communication channels 12, 14, 16 and the media sources 10 communicating with these channels 12, 14, 16. In one embodiment, the media sources 10 are discovered by the media player 300 using the Universal Plug and Play (UPnP) architecture.

In one embodiment, the link manager 330 sends information indicating the capability of the media player 300 to the media sources 10 before a session is started to receive the media item from the media sources 10. The information indicating the capability of the media player 300 may include, among other information, the formats of the compressed video or audio data compatible with the media player 300, the maximum resolution in number of horizontal and vertical lines in the screen 360 (e.g., a high-definition or a standard-definition screen), the DRM formats supported, and the buffering capacity of the media player 300. Based on the information indicating the capability of the media player 300, the media sources 10 can determine the optimal formats for transmitting the media item during a session with the media player 300.

The link manager 330 also monitors the available communication channels 12, 14, 16, and generates the QoS information for each communication channels 12, 14, 16. The QoS information represents the communication quality and the available bandwidth of the communication channels 12, 14, 16. The QoS information can include, among other data, packet losses, data corruption rate, and latency. The QoS information is sent to the media sources 10. Based on the QoS information, the media sources 10 may determine the available bandwidth of the communication channels 12, 14, 16, dynamically change the formats of the media items, determine the number or types of packets to be sent over each communication channels, and change the types of error resilience to be used in the communication between the media sources 10 and the media players 18.

The compressed media processor 340 is coupled to the link manager 330. In the embodiment of FIG. 3, the compressed media processor 340 includes, among other modules, a transcoder 342, a transcaler 344, and a transcrypter 346. The transcoder 342, the transcaler 344, and the transcrypter 346 serve the same function as ones explained with reference to FIG. 2. Note that only some of these modules may be implemented in the compressed media processor 340.

The compressed media processor 340 converts or bypasses the reconstructed media item received from the link manager 330. The compressed media processor 340 converts the reconstructed media item into a format compatible with the decoder 350 or bypasses the reconstructed media item if the media item is already in a format compatible with the decoder 350. For example, if the reconstructed media item is in a high-definition format video data but the screen 360 is capable of displaying only in a standard-definition, the compressed media processor 340 transcales the reconstructed media item into a standard-definition media item before providing it to the decoder 350.

In the unicast mode, the media source 10 can send the media item to the media players 18 requesting the media item in a format that requires the least amount of bandwidth. The compressed media processor 340 can then convert the reconstructed media item to a format that is compatible with the decoder 350.

In the multicast mode or the broadcast mode, the media source 10 may send the media item in a format that is compatible with the least capable media player 18 of the media players 18 requesting the media item. For example, assume that all of the media players 18A through 18C of FIG. 1 requested the service of the same media item from the media source 10A. Also assume that the media player 18A is capable of decoding the media items in the MPEG-2 format but not in the H.264 format. Even if the media players 18B and 18C are capable of decoding the media items in both the MPEG-2 format and the H.264 format, the media source 10A may transmit the media item in the MPEG-2 format to allow all of the media players 18A through 18C to play the requested media item. If the media player 18A stops receiving the media item, the media source 10A can then convert and send the media item in the H.264 format that has a higher compression ratio compared to the MPEG-2 format.

The decoder 350 is coupled to the compressed media processor 340. The decoder 350 receives the converted or unconverted media item from the compressed media processor 340. The decoder 350 may be capable of decoding various formats or it may be capable of decoding only one format. If the decoder 350 can decode only one format, the compressed media processor 340 will always provide the media item in the format that is compatible with the decoder 350. Then, the decoded data signal is provided to the screen 360 and the speaker 370.

Each of these functional components in the media player 300 can be implemented separately or can be implemented together. For example, the link manager 330 and the compressed media processor 340 can be implemented as one module. Moreover, each component, whether alone or in combination with other components, can be implemented for example, in software, hardware, firmware or any other combination thereof.

Figure 4:
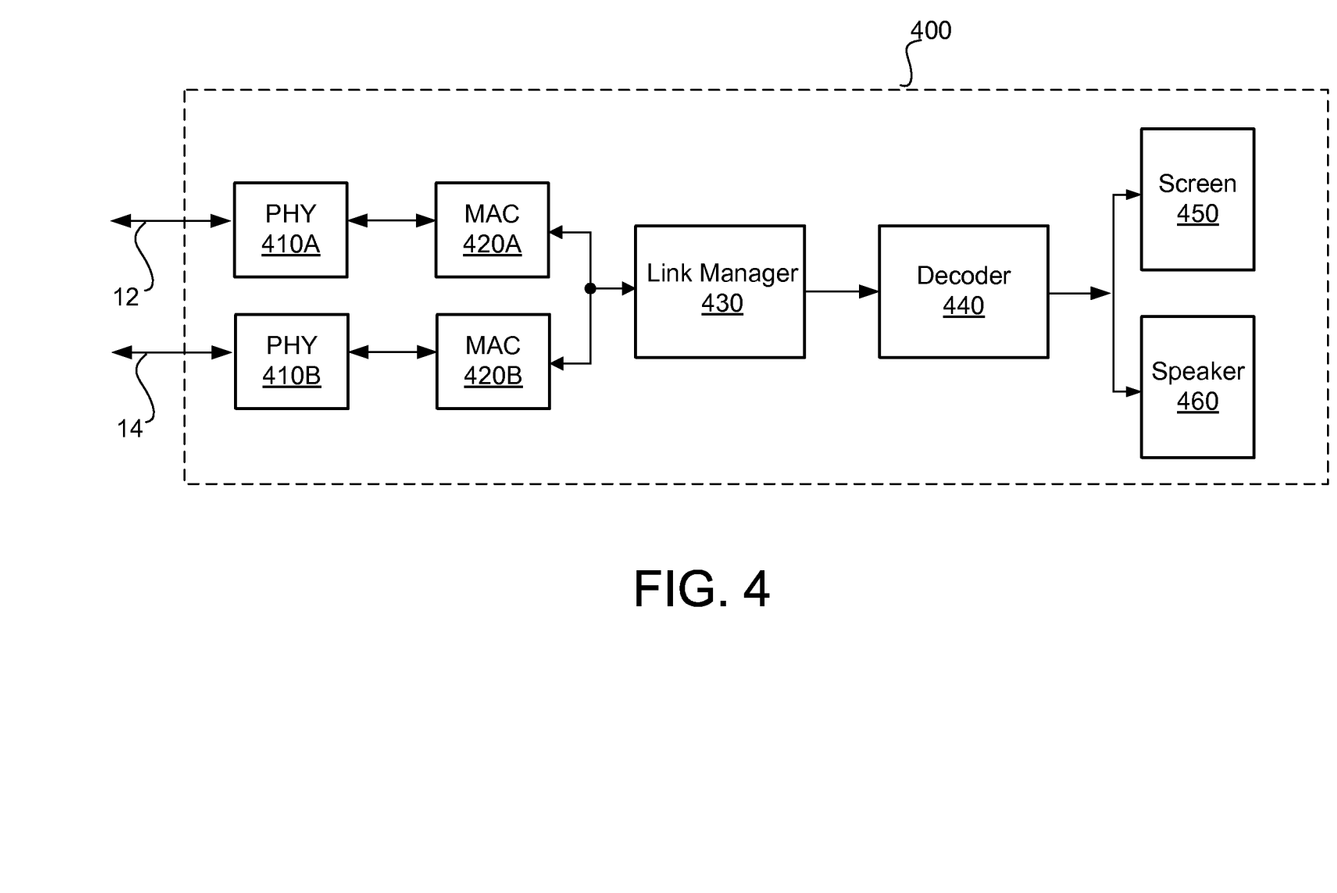
FIG. 4 is a block diagram illustrating another embodiment of a media player.

FIG. 4 is a block diagram illustrating another embodiment of a media player 400. The embodiment of FIG. 4 is a simplified version of the media player 400, and does not include the compressed media processor 340. Also, in this example embodiment, the media player 400 can access only two of the communication channels 12, 14; and thus have two PHY layers 410A, 410B, and the corresponding MAC layers 420A, 420B. The link manager 430 serves the same function as the link manager 330 of FIG. 3.

The media item reconstructed by the link manager 430 is sent to the decoder 440 for decoding. The decoded data are then provided to the screen 450 and the speaker 460 as explained with reference to FIG. 3.

In this simplified version of the media player 400, the capability information sent to the media source 10 by the link manager 430 will indicate which formats the decoder 440 are capable of playing. The media source 10 will then transmit the media item to the media player 400 in a format that is compatible with the decoder 440.

Each of these functional components in the media player 400 can be implemented separately or can be implemented together. For example, the link manger 430 and the decoder 440 can be implemented as one module. Moreover, each component, whether alone or in combination with other components, can be implemented for example, in software, hardware, firmware or any other combination thereof.

Method for Transmitting and Receiving the Media Item

Figure 5A:
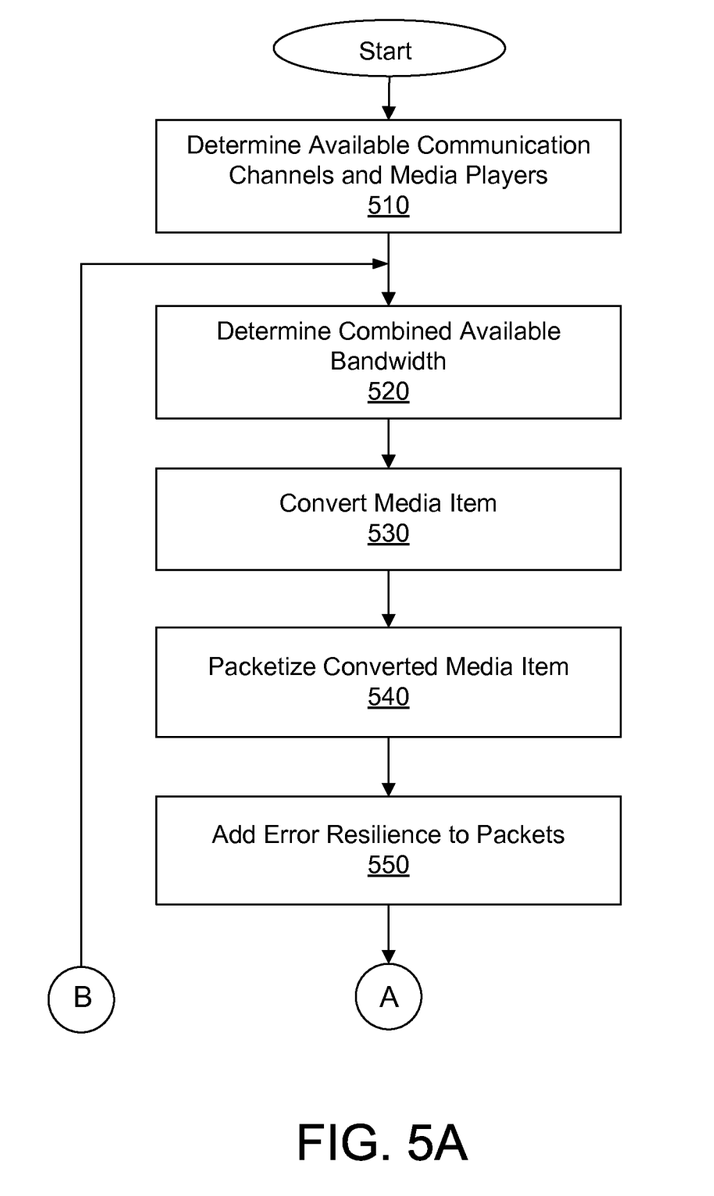
FIGS. 5A and 5B are flow charts illustrating an embodiment of a method for transmitting a media item from a media source to a media player.
Figure 5B:
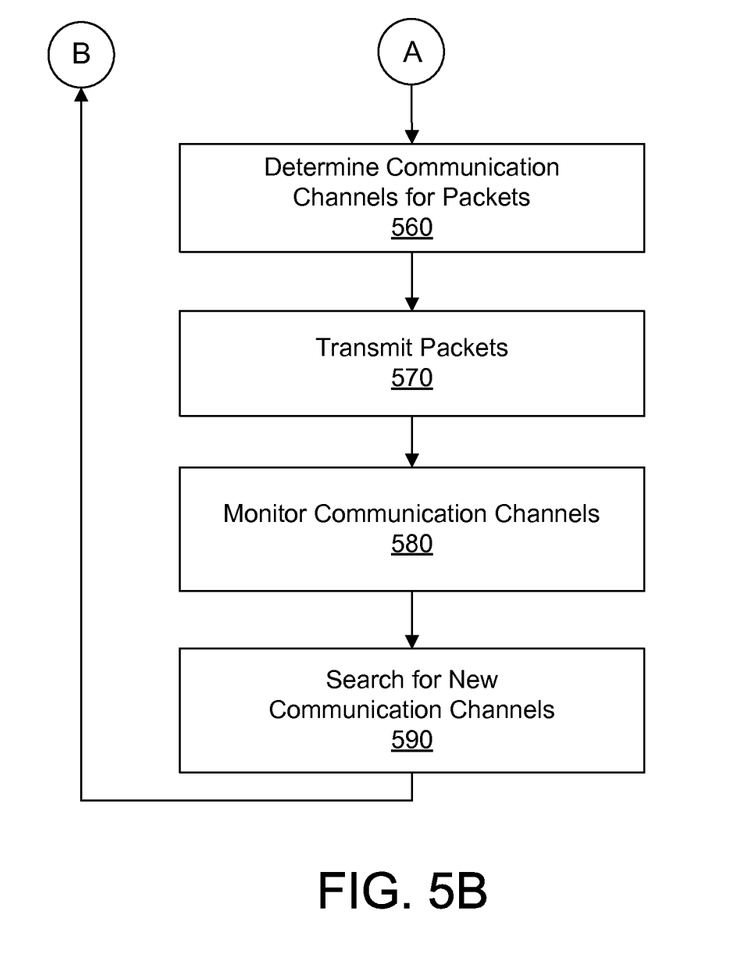

FIGS. 5A and 5B are flow charts illustrating an embodiment of a method for transmitting a media item from the media source 10 to the media player 18. First, the media source 10 determines 510 the available communication channels 12, 14, 16 and the media players 18 communicating therewith. As explained above with reference to FIG. 2, the media sources 10 send the test packets to the media players 18 through the communication channels 12, 14, 16. In response, the media players 18 send replies to the media sources 10 via each of the communication channels 12, 14, 16. Based on the replies from the media players 18, the media sources 10 determine the available communication channels 12, 14, 16. In one embodiment, the media players 18 also send the information indicating its capabilities to the media source 10 using the UPnP architecture.

Once one or more media players 18 request service of the media item from the media source 10, the media source 10 sends the packets including the media items to the media players 18. The initial set of packets from the media source 10 to the media players 18 may have increased error resilience so that the media players 18 can reconstruct the media item even if not all of the packets are delivered successfully to the media players 18. The media players 18 then send the QoS information to the media source 10. Based on the QoS information, the media source 10 determines 520 the combined available bandwidth of the communication channels 12, 14, 16.

Based on the combined available bandwidth and the capability of the target media players 18, the media source 10 determines the format to which the media item should be converted before transmitting it over the communication channels 12, 14, 16. The media source 10 then converts 530 the media item into the determined format. Note that the step 530 is optional. If the signal source 210 (shown in FIG. 2) provides the media item in a format that is compatible with the media players 18 and there is sufficient bandwidth to transmit the media item in that format, the media item 530 need not be converted.

Thereafter, the converted media item is packetized 540 into multiple packets. Various packetizing schemes including, among other schemes, a variant of IPv4 or IPv6 may be used to packetize the converted media item. Then the error resilience to the packets may be added 550 by using, among other methods, partitioning the data based on importance, generating the redundant headers or implementing the forward error correction.

Next, the communication channels for the packets are determined 560. In one embodiment explained with reference to FIG. 2, the packets including data with the high priority may be sent over the most reliable communication channel. The number of packets to be sent over each communication channels 12, 14, 16 may be determined from the available bandwidth of each communication channels 12, 15, 16.

Then the packets are transmitted 570 from the media sources 10 to the media players 18. In another embodiment, when the media sources 10 and the media players 18 operate in the multicast or the broadcast mode, the media sources 10 may send the packets through the communication channels 12, 14, 16 that are connected to the most number of media players 18.

Based on the packets received from the media source 10, the media players 18 generate the QoS information. The QoS information is sent to the media source 10 so that the media source 10 can use the QoS information to monitor 580 the available bandwidth of the communication channels 12, 14, 16. The media source 10 may periodically search 590 for new communication channels by transmitting the test packets to the media players 18 and collecting replies to the test packets from the media players 18.

Figure 6A:
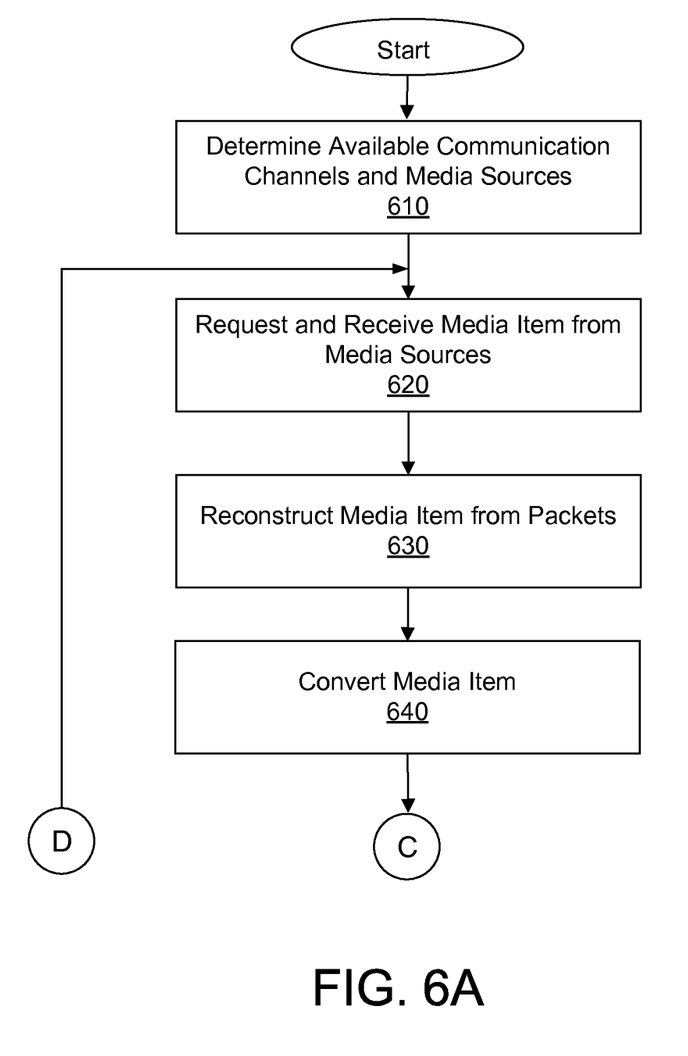
FIGS. 6A and 6B are flow charts illustrating an embodiment of a method for receiving a media item by a media player.
Figure 6B:
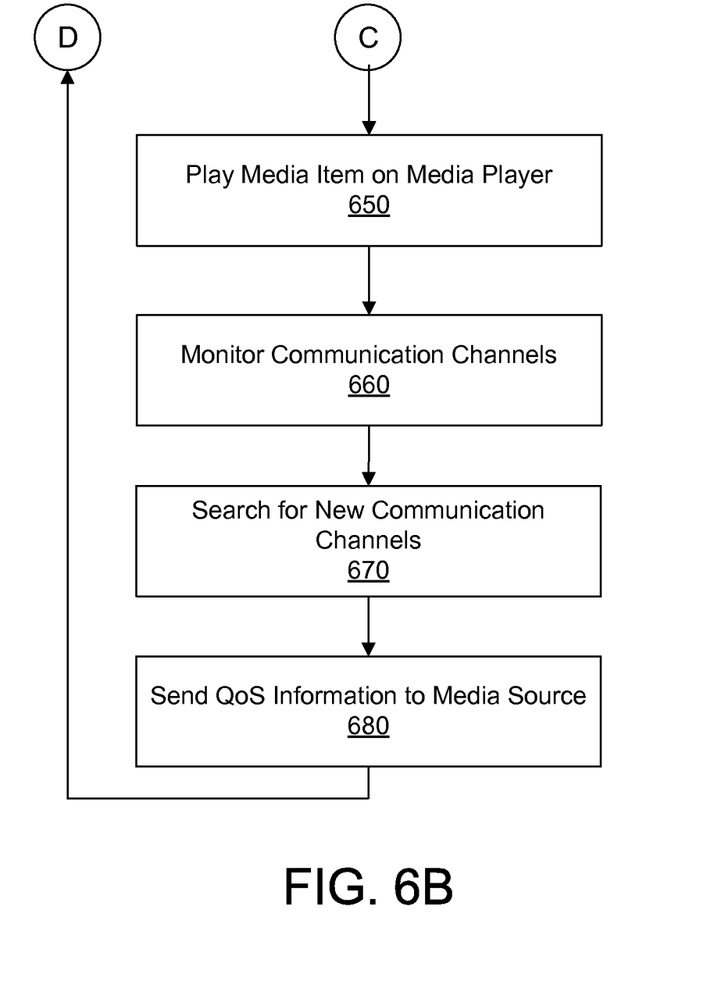

After monitoring the communication channels, the process returns to the step 520 where the combined bandwidth is determined. FIGS. 6A and 6B are flow charts illustrating an embodiment of a method for receiving the media item by the media player 18. First, the media player 18 determines 610 the available communication channel and discovers the media sources 10 communicating therewith. Thereafter, the media player 18 requests and receives 620 the media item from the media sources 10.

After receiving the media item in the form of packets, the media player 18 reconstructs 630 the media item. During the reconstruction, the header portion of the packets are stripped off and assembled in the order as indicated by the information in the header. If redundant packets are received, they are discarded. Then the media item can be converted 640 by the compressed media processor 340 (shown, for example, in FIG. 3) so that the media item can be decoded by the decoder 350 (shown, for example, in FIG. 3). Note that the step 640 is optional. If the media item reconstructed by the link manager 340 (shown, for example, in FIG. 3) is compatible with the decoder 350, this step 640 may be omitted. After processing 640 the media item, the media item is played 650 on the media player 18 using output devices such as a screen or a speaker.

The media player 18 monitors 660 the communication channels 12, 14, 16 and generates the QoS information. The media player 18 may also search 670 for new communication channels. Note that the steps 660 and 670 can be performed in parallel with the steps 630 through 650. The media player 18 then sends 680 the QoS information to the media sources 10 so that the media sources 10 can determine the available combined bandwidth of the communication channels 12, 14, 16.

Alternate System (and/or Method) Embodiments

In one embodiment, only one media player and only one media source is used. The media player and the media source communicate through multiple communication channels but MAC layers may be obviated or reduced to a very simple format of detecting interferences because no other media players or media sources share the same communication channels.

The method of transmitting the media item of the above embodiments has the advantage of allowing the user to experience the media item on a media player even when the bandwidth of one communication channel is insufficient to carry the media item. Also, the method of transmitting the media item of the above embodiments has the advantage of allowing a more robust and reliable transmission of the media item.

The various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for a software configured multimedia control mechanism through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of transmitting a media item from a media source to a media player, the method comprising:
determining communication channels available for transmitting the media item from the media source to the media player, the available communication channels including at least a first communication channel provided over a first type of physical medium and a second communication channel provided over a second type of physical medium, the second type of physical medium different from the first type of physical medium;
converting the media item into a plurality of packets of a format adapted for transmitting over combined bandwidth of the available communication channels, each of the plurality of packets including a header indicating a type of communication channel over which each of the plurality of packets should travel;
resolving a conflict over use of the first communication channel with another media source using a predetermined scheme; and
transmitting each of the plurality of packets to the media player over the type of communication channel available and indicated in the header of each of the plurality of packets.

2. The method of claim 1, further comprising:
monitoring a bandwidth of at least one available communication channel; and
adjusting the number or types of packets to be sent over the available communication channels based on the monitored bandwidth.

3. The method of claim 1, wherein the method further comprises adjusting the format of the converted packets based on the combined bandwidth of the available communication channels.

4. The method of claim 1, wherein the method further comprises adding error resilience to the packets.

5. The method of claim 1, wherein one or more packets including critical data are transmitted to the media player over a communication channel that is most reliable.

6. The method of claim 1, wherein determining available communication channels comprises:
sending a test signal to the media player over all of the communication channels; and
receiving a reply signal from the media player responsive to the test signal.

7. The method of claim 1, wherein converting the media item comprises compressing, transcoding, transrating, transcaling or transcrypting of the media item.

8. The method of claim 1, further comprising:
detecting whether the other media source is communicating over the first communication channel.

9. The method of claim 1, wherein the method further comprises receiving information on capability of the media player over the available communication channels, and wherein the format into which the media item should be converted is compatible with the capability of the media player.

10. A media source for transmitting a media item to a media player, the method comprising:
a communication module communicating with the media player using available communication channels, the available communication channels comprising at least a first communication channel provided over a first type of physical medium and a second communication channel provided over a second type of physical medium, the second type of physical medium different from the first type of physical medium, the communication module resolving a conflict over use of the first communication channel with another media source using a predetermined scheme;
a media processor coupled to the link manager, the media processor converting the media item into a plurality of packets of a format adapted for transmitting the media item to the media player, each of each of the plurality of packets including a header indicating a type of communication channel over which each of the plurality of packets should travel; and
a link manager coupled between the communication module and the media processor, the link manager determining combined bandwidth of the available communication channels and assigning each of the plurality of packets to one of the communication channels based on indication of the type of communication channel in the header.

11. The media source of claim 10, wherein the link manager adjusts a number or types of packets to be sent over the available communication channels based on changes in a bandwidth of at least one available communication channel.

12. The media source of claim 10, wherein the media processor adjusts the format of the packets into which the media item should be converted based on the combined bandwidth of the available communication channels.

13. The media source of claim 10, wherein packets including critical data are transmitted over a communication channel that is most reliable.

14. The media source of claim 10, wherein converting the media processor is adapted to perform compression, transcoding, transrating, transcaling or transcrypting of the media item.

15. The media source of claim 10, wherein the communication module detects whether the other media source is communicating over the first communication channel.

16. A media player for playing a media item received from a media source, the media player comprising:
a communication module communicating with the media source using available communication channels, the available communication channels comprising at least a first communication channel provided over a first type of physical medium and a second communication channel provided over a second type of physical medium, the second type of physical medium different from the first type of physical medium, the communication module resolving a conflict over use of the first communication channel with another media source using a predetermined scheme;
a link manager coupled to the communication module, the link manager generating and transmitting to the media source information representing a quality of service of each communication channel, the link manager reconstructing the media item from data received simultaneously from the available communication channels;
a decoder coupled to the link manager for decoding the reconstructed media item; and
a media processor coupled to the link manager and the decoder, the media processor adapted to perform transcrypting of the reconstructed media item.

17. The media player of claim 16, wherein the communication module searches for the available communication channels, and detects media sources communicating through the available communication channels.

* * * * *